March 7, 1939.   H. S. GEORGE   2,149,844
TUBULAR STRUCTURE EMBODYING WELDED JOINT AND METHOD OF MAKING THE SAME
Filed March 7, 1935    2 Sheets-Sheet 1
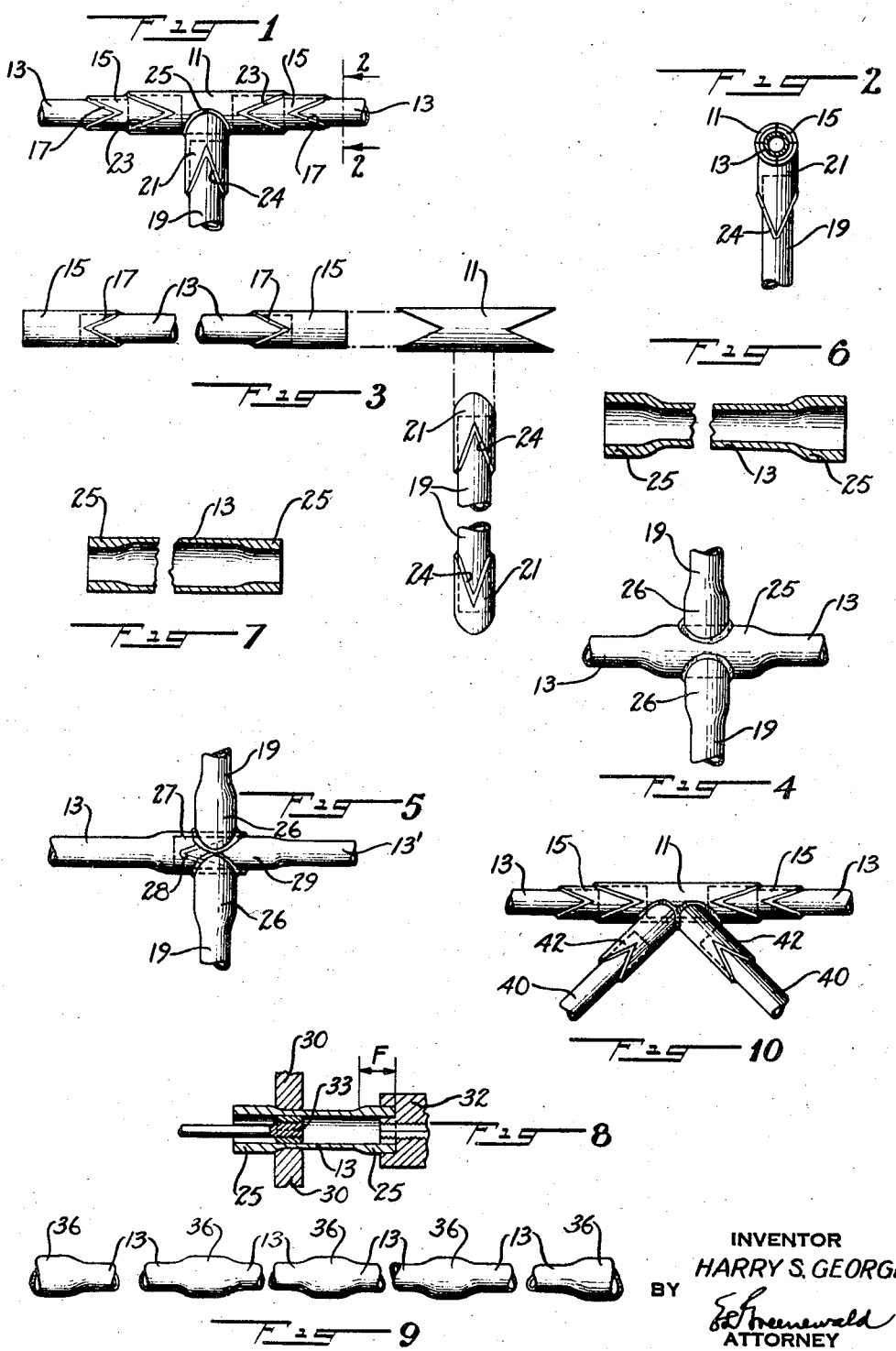
INVENTOR
HARRY S. GEORGE
BY
ATTORNEY

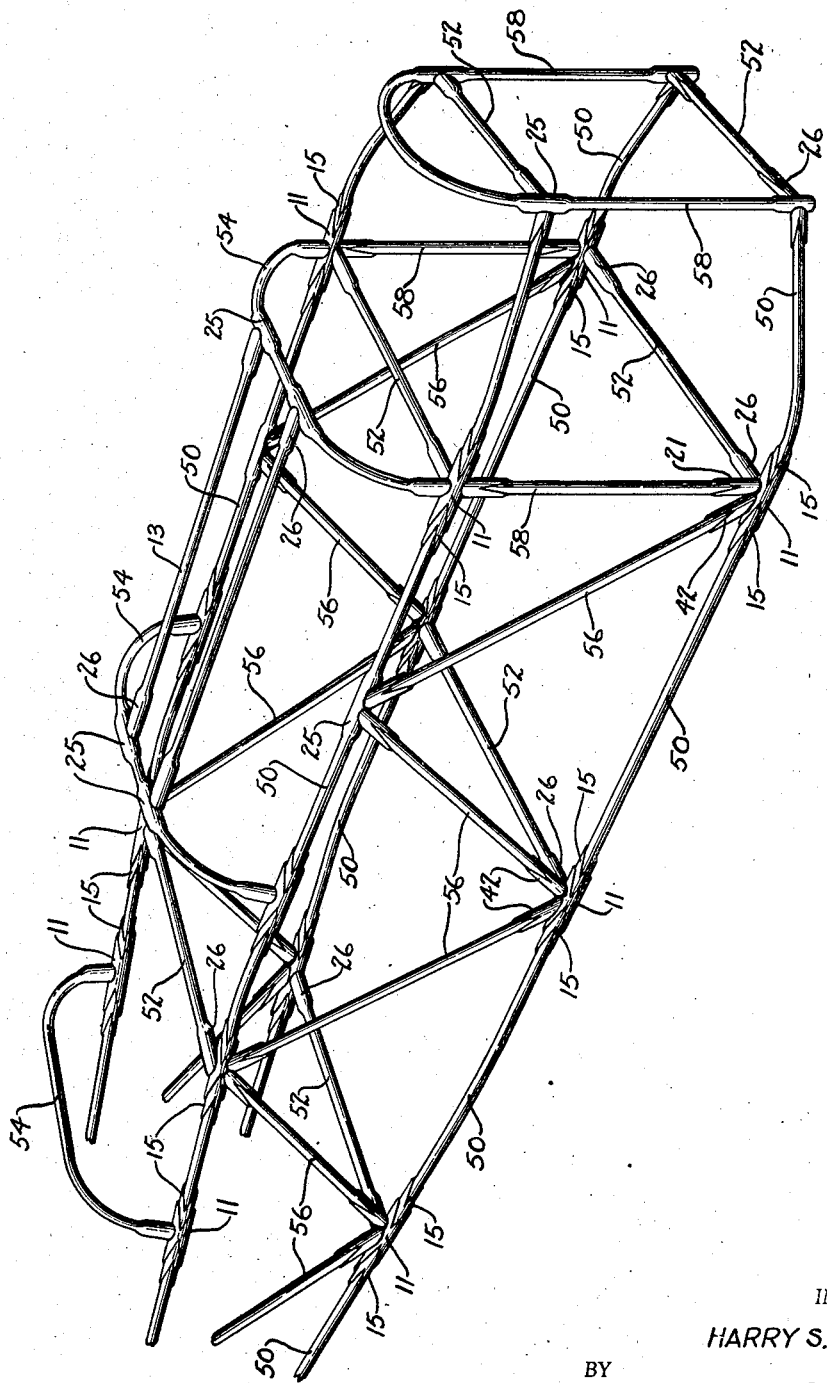

Patented Mar. 7, 1939

2,149,844

UNITED STATES PATENT OFFICE 2,149,844

TUBULAR STRUCTURE EMBODYING WELDED JOINT AND METHOD OF MAKING THE SAME

Harry S. George, Massapequa, N. Y., assignor, by mesne assignments, to Union Carbide and Carbon Corporation, a corporation of New York Application March 7, 1935, Serial No. 9,695

17 Claims. (Cl. 29—152)

This invention relates to a welded joint and to a method for its production. More especially it concerns the production of an airplane fuselage, or similar welded truss structure composed of members or assemblies which have been heat-treated prior to the welding operation,—which welded structure has a strength adjacent the weld at least approximating the strength that would be possessed by it if it were heat-treated as a unit after the welding operation.

Although the present invention has a wide field of usefulness for general construction purposes, it is of special utility in the production of welded joints from heat-treated members of special alloy steels, such for example as the chromium-molybdenum steel and stainless steel seamless tubing widely used in aircraft manufacture for airplane fuselages, where a high strength and light weight alike are essential, but where it is impracticable to heat-treat the welded assembly after its fabrication.

Heretofore, in the case of welded T-joints, lattice joints, and the like, normally loaded to high stresses near the joint, the required high strength generally has been secured by the selection of tubing of ample size to provide an unheat-treated joint of the desired strength, and/or by the use of gusset plates, straps, and the like. This results in a very substantial increase in the weight of the members composing the joint over that which would be required if the completed assembly could be heat-treated after the welding operation; and there is an increase in the cost of material and labor.

Welding reduces the strength of heat-treated tubing adjacent the welded joint because of the resultant local tempering effect of the welding heat. A line or zone of weakness is formed extending parallel to the line of the weld and spaced therefrom. In a series of tests upon various welded T-joints and lattice joints made of tubing of chromium-molybdenum alloy, this line of weakness lay about ½ inch from the weld and coincided with a zone of minimum hardness of the base metal.

In accordance with the present invention, additional strength is imparted to the welded structure at and adjacent the joint while limiting the weight of the various members composing it. This is accomplished by enlarging the diameter of the ends of said members and/or by increasing the total cross-sectional area of metal at such ends which are to be joined to other members by welding.

Among the more important objects of the invention are: to provide in novel manner for compensating for the loss in strength occurring at welded joints formed of heat-treated members due to the tempering effect of the welding operation; to provide additional strength to a structure adjacent a welded joint while limiting the weight of the structure; to provide a novel welded structure formed of alloy steel members hardened by heat treatment or cold working before welding, the strength of which structure is substantially undiminished by the welding operation; to provide a novel welded structure composed of cold drawn members of heat-treated alloy; and to provide cold drawn tubing adapted for use in the manufacture of the said welded structure, successive portions of the length of which tubing have different wall thicknesses and/or different diameters.

In the practice of the invention, the end of each of the tubes forming the joint is provided thereat with an expanded on enlarged portion or member, and/or one having sufficient cross-sectional area of metal that, when the said ends are welded in place to form the joint, the zone or line of weakness, i. e.,—the so-called "annealed ring",—will fall within such enlarged portion or member, and this unheat-treated portion will have a total strength as great or greater than those heat-treated portions not affected by the welding operation, or which will approach such strength as nearly as may be desired.

Referring now to the accompanying drawings which illustrate my invention,

Fig. 1 is a side elevation of a T-joint assembly embodying the invention;

Fig. 2 is a section taken along the line 2—2 of Fig. 1, looking in the direction of the arrows;

Fig. 3 is a side elevation of various unassembled elements shown in the assembly of Fig. 1;

Figs. 4 and 5 respectively, are side elevations of modified joint assemblies formed from tubing having enlarged ends;

Figs. 6 and 7 are fragmentary longitudinal views which illustrate forms of cold drawn tubing having reinforced ends of increased wall thickness;

Fig. 8 illustrates somewhat diagrammatically a step in the cold drawing of tubing;

Fig. 9 is a side elevation of tubing having spaced enlarged portions, parts being broken away;

Fig. 10 is a side elevation of a lattice joint assembly embodying the invention; and Fig. 11 is a perspective view of an airplane fuselage embodying the invention, parts being broken away.

The improved joint of the present invention preferably comprises heat-treated tubular structural members of hardened metal, each having an end portion or extension of increased total cross-section of metal adjacent the joint. The area of the said end portion or extension is such that when the members are welded to form the joint, the "annealed ring", constituting the zone of greatest weakness in the structure, will lie within the area of the enlarged end portion. Therefore, by virtue of the resultant distribution of stresses applied to the joint over the larger cross-sectional area of metal of the end portion, the portions of the welded joint which heretofore have been known to have the minimum strength and hardness of base metal may be made as strong or stronger than the remainder of the tubing. The portions of the heat-treated hardened metal tubing remote from the welding zone need be only of sufficient size to resist the stresses normally encountered at such points.

In the modification shown in Figs. 1 to 3, the joint comprises a sleeve 11, of suitable metal or alloy, open at both ends and adapted to house more or less snugly therein the enlarged end portions of tubular members 13, 13 of steel or alloy, which may form the struts or longerons of an airplane fuselage or other structure. As shown, these enlarged end portions are in the nature of tubular collars or bushings 15, 15. The outer diameter of each bushing 15 is such that an end of the latter extends into and fits snugly within the passageway in the sleeve 11.

The opposite ends of each bushing 15 is shrunk on and/or welded to an end of a tubular member 13, 13, preferably by a modification of the oxy-acetylene process or an equivalent welding process. The end margins of the tubular members 13 may, if desired, be expanded for the purpose. The end margin of each bushing 15 at the line of the weld 17 joining the members 13 and 15 may be staggered, as shown, for increasing the length of the annealed "ring", so as to distribute the latter over a considerable area and deconcentrate the lines of weakness. The end margins of the sleeve 11 may be staggered for a similar reason, to provide staggered lines of weld 23, preferably parallel to the lines 17.

The joint also may comprise one or more metal or alloy bracing struts or tubular joint members 19, each having a bushing 21 welded thereto at one end along a staggered line of weld 24. The end of the bushing 21 is shaped to fit closely the curved outer surface of the sleeve 11, as shown in Figs. 1 and 2.

In the fabrication of this form of joint, the respective bushings 15, 15, 21 first are welded to the corresponding tubular members 13, 13, 19. These welded structures then are heat-treated to increase their strength and hardness. The joint is then formed by assembling the members 13, 13, in the sleeve 11, welding the bushings to the sleeve along the zig-zag lines 23, and then welding the free end of bushing 21 to the mid-portion of the sleeve at the desired angle, along the line of weld 25.

If desired, a single, continuous tubular member 13 may be employed, having a slip-over sleeve 11 welded thereon at a selected joint midway of its length, and the welded area heat-treated. A bracing strut or member 19, having welded thereon an enlarged bushing 21, may then be welded to the sleeve 11 in the manner described above, to provide a joint of great strength adjacent the line of weld even in the absence of special heat treatment.

The following will exemplify the invention:

A reinforced T-joint of the type shown in Fig. 5 1 may be made from chromium-molybdenum seamless steel tubing 13, having an outside diameter of 1⅛ inches, and a wall thickness of .049 inch, and which when heat-treated has a tensile strength of 130,000 to 150,000 pounds per square inch. The bushing members 15 employed have outside diameters sufficiently large to slip freely over the 1⅛ inch × .049 inch tubing. They also have wall thicknesses providing metal,—possessing a strength of at least around 90,000 pounds per square inch as welded,—in amount sufficient to produce a final tube and joint having a strength at and adjacent the weld equal to that of the heat-treated tubing 13 of smaller diameter.

The bushings 15 first are welded to the tubing 13 in the manner described, and the composite structure then is heat-treated to increase the tensile strength of the tubing. The heat treatment may be confined to the zones affected by welding, if desired. The free end of the bushing is then inserted into sleeve 11 and is welded thereto. Similarly, the other members of the joint are provided with enlargements or bushings and, after heat treatment of the structure or the zone affected by the previous welding, are welded to the sleeve 11. The members 13 preferably are of a diameter and wall thickness at least as great as the diameter and wall thickness of the strut member 19.

In a modification of the invention employing cold drawn metal or alloy tubing for the elements of the joint, the use of a sleeve 11 for purposes of assembly of the joint is unnecessary. Illustrated in Fig. 4 is a continuous longeron 13 of cold drawn tubing having an intermediate section 25 of increased diameter, and preferably also of increased wall thickness, though the latter is not essential. Secured to the longeron at the section 25 thereof are strut members 19, having enlarged end marginal portions 26 welded to the section 25 of the former. Acetylene welding is preferred for the purpose.

Another form of construction is shown in Fig. 5, wherein numeral 27 designates an enlarged end portion of cold drawn tubing 13 having its end margin 28 staggered or zig-zag as shown. An enlarged end portion 29 of a second cold drawn tubular member 13' is adapted to be inserted within the portion 27 of the tubular member 13 and to be secured therein by welding along the margin 28 of the latter. The strut members 19, 19, are then welded to the enlarged portions of the members 13, 13' in the general manner hereinbefore described. The enlarged end portion 27 has a greater total cross-sectional area of metal than the enlarged end portion 29.

Figs. 6 and 7 respectively illustrate two forms of cold drawn tubing having enlarged or reinforced end portions, and suitable for use in the present invention.

The tubing shown in Fig. 6 may be shaped by cold-drawing it in the following manner:

The tubing 13 is cold drawn to a final end size desired for the large end margins 25. A split die 30 (see Fig. 8) is then placed around the tubing at a point removed from the end of the tubing a distance F, equal to the desired length of the expanded end margin 25. A draw chuck 32 is then attached to the end of the tubing, and the latter is drawn past the die and an interior swaging member 33, thus swaging the tubing at the die and drawing the tubing through the die. This swaging and drawing operation is then repeated until the swaged portion of the tubing is of the desired outside diameter and length. The tubing is then ready for use; or it can be cut into suitable lengths.

The swaging and die-drawing of the tubing may be discontinued at selected spaced zones, during the movement of the tubing past the die induced by the draw chuck. Thus are produced enlarged zones 36, separated from each other by tubular zones 13 of smaller diameter formed by action of the die 30, as indicated in Fig. 9.

Fig. 7 illustrates a form of metal tubing having reinforced ends of increased wall thickness, but wherein the outside diameter at the ends is substantially the same as that of the midportion of the tubing. This tubing preferably first is heat-treated, after which the reinforcing and connecting member 11 is welded to the thick end portions of the tubing.

Fig. 10 illustrates one application of the invention to the construction of a lattice joint suitable for an airplane fuselage. The longerons 12 have welded bushings 15 secured within the sleeve 11, and the welded zones heat-treated. The construction of this joint is very similar to the construction shown in Figs. 1 to 3.

Each of two lateral tubular struts 40 has a corresponding bushing 42 of greater diameter, secured thereto by welding followed by a heat-treatment of at least the zone affected by welding. The free end of each bushing 42 is shaped to closely engage both a portion of the curved surface of the sleeve 11 and a portion of the adjacent containing surface of the other bushing 42. The contacting surfaces of the bushings and sleeve are intimately joined by acetylene welding or its equivalent, as illustrated.

Fig. 11 illustrates one form of airplane fuselage produced in accordance with the invention, utilizing welded joints of great strength, the resultant truss structure having substantially the same weight and strength as are possessed by a similar structure hardened as a unit by the same heat treatment following the various welding operations thereon. Heretofore, attempts to harden such a truss structure as a unit have been unsatisfactory, since the heat-treatment of the entire unit has invariably resulted in warping of the truss members during the treatment.

Prior to their assembly to form the fuselage, the various longerons 50, cross members 52 and 54, diagonal strut members 56, and vertical members 58, illustrated in Fig. 11, preferably are shaped as desired and their enlarged ends are prepared and hardened in suitable manner as hereinbefore disclosed. In the modifications shown in Figs. 1 to 3, and 10, the hardening treatment is given after the bushing members 15, 42, have been welded to the said longerons, struts, and other truss members, and before their assembly.

The invention is adapted for use with other fuselage designs than that illustrated, and other arrangements of members forming the welded joints may be employed in accordance with the invention without departing from the spirit thereof. Thus a welded tubular structure of any size is made possible, comprising a plurality of welded joints and a plurality of members previously hardened by heat treatment or cold working before welding, which structure has substantially the same strength and weight as a similar structure which had been hardened as a unit, by the same type of heat treatment, after the welded joint had been formed.

It will be understood that the improved fuselage of the present invention may not require the use throughout of the particular type of welded joint herein described. At points where a high strength-weight ratio is not vital, some form of joint of the types used prior to my invention may be employed.

It is within the purview of the invention to use either the same or different ferrous or non-ferrous metal alloys in fabricating the various elements of the joint structure, for controlling the physical and chemical properties of the members forming the joint. Thus, a metal or alloy may be selected for the sleeve 11 which, while having satisfactory strength and toughness, is especially resistant to the tempering action of the heat applied thereto during the welding operation, or which possesses properties which at least partially offset such tempering effect.

The present invention successfully compensates for the loss of strength occurring at joints formed of a plurality of members, due to the effect of heat produced therein during a welding or similar operation, particularly when using heat-treated members made of chromium-molybdenum and similar alloy steels.

The invention is susceptible of modification within the scope of the appended claims.

I claim:

1. A welded joint comprising a tubular member of hardened metal, the said member having an expanded portion of greater total cross-sectional area of metal than the remaining portion thereof, and at least one lateral tubular member having an enlarged end welded to the first-named member at the said expanded portion.

2. A welded joint comprising two aligned tubular metal structural members, each having welded thereon a bushing member of greater diameter than either of the said tubular members and of at least as great a cross-sectional wall area as the latter, each of the resultant welded assemblies having been hardened after the said welding operation, and a tubular metal sleeve welded at its respective ends to a corresponding one of the said bushings, the said sleeve and bushings being as strong adjacent the welded area without subsequent heat treatment as are the portions of the tubular members remote from the welded areas and which were unaffected by the welding operation.

3. A welded joint comprising two aligned spaced tubular metal structural members, each having welded thereon a bushing member of greater diameter and greater wall thickness than either of the said tubular members, at least the zones affected by the said welds being hardened, and a sleeve welded at its respective ends to a corresponding one of the said bushings along a staggered line in a welding zone, and at least one lateral tubular structural member welded to the sleeve midway of its ends.

4. A fuselage for aircraft, comprising a plurality of welded joints, at least one of the said joints being formed of a tubular member of hardened metal having a portion of greater cross-sectional area of metal than the adjacent portions thereof, and at least one lateral tubular member having an enlarged end welded to the first-named member at the said portion of greater cross-sectional area.

5. A fuselage for aircraft, comprising a plurality of welded joints, at least one of the said joints being formed of a tubular member of hardened chromium-molybdenum alloy steel having an expanded portion of greater cross-sectional area of metal than the adjacent portions thereof, and at least one lateral tubular member of hardened chromium-molybdenum alloy steel having an enlarged end welded to the first-named member at the said expanded portion of greater cross-sectional area.

6. A welded airplane fuselage formed of welded tubular members the maximum strength of which are substantially undiminished by the welding operation, and comprising a plurality of welded joints, at least one of the said joints being formed of two aligned spaced tubular members of hardened chromium-molybdenum steel, each of the latter having an end portion of enlarged diameter, and a reinforcing and connecting sleeve member of chromium-molybdenum steel having a diameter at least as great as that of the said end portions of the first-named tubular members, the said connecting member being welded to each of these end portions, and at least one lateral tubular member of hardened chromium-molybdenum steel having an enlarged end welded to the said sleeve member.

7. The process of producing a welded joint adapted for use in airplane fuselage construction, which comprises welding an end of a tubular metal bushing to and around an end of a tubular structural member, hardening the said member and bushing assembly at least adjacent the welding zone, inserting the free end of the bushing in a tubular sleeve, and welding the bushing and sleeve together.

8. The process of producing a welded joint adapted for use in airplane fuselage construction, which comprises welding an end of a tubular metal bushing to and around a tubular structural member of smaller diameter aligned therewith, hardening the assembly of the said member and bushing at least adjacent the welding zone, inserting the free end of the bushing in a tubular sleeve, welding the bushing and sleeve together, and thereafter welding at least one lateral tubular structural member to the said sleeve.

9. The process of producing a welded joint adapted for use in airplane fuselage construction, which comprises inserting an end of a tubular structural member within an expanded end portion of a second structural member aligned therewith and having an irregular end margin, welding the two members together along the line of the said end margin, hardening the resultant assembly, and thereafter welding to the expanded portions of both the first-named and the second-named members at least one lateral structural member having a reinforced end portion, with the latter directly welded to the said expanded portions.

10. The process of producing a welded joint adapted for use in airplane fuselage construction, which comprises inserting an expanded end of a tubular structural member within an expanded end portion of a second structural member, the last-named end portion having a greater total cross-sectional area of metal than the first-named member and being aligned therewith, the said second member having a staggered end margin, welding the two members together along the line of the staggered end margin, hardening the resultant assembly at least adjacent the line of the said weld, and thereafter welding to the expanded portions of both the first-named and the second-named members at least one lateral structural member having a reinforced end portion, with the latter directly welded to the said expanded portions.

11. The method of preventing loss of strength in welded joints due to the heat-tempering effect of a welding process, which comprises providing the adjacent ends of each of two aligned spaced heat-treated metal tubular members with expanded heat-treated end portions of greater diameter than the midportion of the said members and of sufficient wall thickness that when the said expanded end portions are welded to a tubular structural member having a total cross-sectional area of metal at least as great as that of the said end portions, the resultant joint will be at least as strong adjacent the unheat-treated welds as is the portion of the heat-treated tubular member remote from the welds, and thereafter welding an expanded end portion of each of the said aligned tubular members to the said tubular structural member.

12. The process of producing a strong welded joint, which comprises welding to an end of each of two tubular members forming the said joint a corresponding collar of larger diameter than the diameter of the said tubular member to which it is welded, hardening each of the resultant welded assemblies, and thereafter welding the free end margins of the respective collars within a tubular reinforcing and connecting sleeve.

13. The process of producing a strong welded joint, which comprises welding to an end of each of a plurality of tubular members forming the said joint a corresponding collar of larger diameter than the diameter of the said tubular member to which it is welded, heat-treating the resultant welded assemblies, inserting the free end margins of two of the respective collars within a tubular reinforcing and connecting sleeve, welding the same thereto along staggered margins of the latter, and welding to a midportion of the said sleeve the free end margin of the collar of a third welded assembly.

14. In the process of producing a welded joint of cold drawn tubing, the steps which comprise cold drawing a metal tubing to a selected final end diameter and metal thickness, swaging the tubing at a selected point adjacent an end thereof, drawing the swaged tubing through a die in a direction away from the said end thereby reducing the diameter at the die-drawn portions of the tubing, thereby producing a cold drawn tubing having an end zone of selected greater diameter than the selected diameter of the intermediate portion, and welding to the tubing at the said zone at least one structural tubular member having an enlarged end-portion, with the last-named portion directly welded to the tubing at the said end zone.

15. In the process of producing a welded joint of cold drawn tubing, the steps which comprise cold drawing metal tubing to a selected final end diameter and metal thickness, swaging the tubing at a selected point near an end thereof, drawing the swaged tubing through a die in a direction away from the said end, thereby reducing the diameter and wall thickness of the die-drawn portions of the tubing and producing a cold drawn tubing having an end zone of selected diameter and wall thickness greater than the diameter and wall thickness of the die-drawn portion, swaging the tubing at a second point spaced from the said die-drawn portion, drawing the last-named swaged portion of tubing through a die, thereby reducing the diameter and wall thickness of the resultant die-drawn portion of the tubing, separating the tubing into selected lengths at the respective portions of the tubing intermediate adjacent die-drawn portions thereof, and welding to the tubing at the said zone at least one structural tubular member having an enlarged end-portion, with the last-named portion directly welded to the tubing at the said end zone.

16. A welded joint adapted for airplane fuselage construction, which comprises two aligned heat-treated tubular members of hardened alloy steel, the end portions of each member being of greater diameter than the intermediate portion thereof, and a reinforcing and connecting sleeve having a diameter greater than that of the said end portions of the tubular members, the said connecting sleeve being welded at its respective ends to the said end portions, the said end portions having walls of sufficient thickness to give the said portions after welding but without subsequent heat-treatment a total strength at least equal to that of the said intermediate portion of the tubular member.

17. A welded joint structure formed of alloy steel members each hardened as a unit before welding to form the said structure, the strength of which members is substantially undiminished by the said welding operation, which structure comprises two aligned spaced tubular members of hardened metal having welded thereon enlarged end portions, the said members and end portions having been hardened as a unit after the welding operation, a reinforcing and connecting sleeve of hardened metal having end portions surrounding the respective enlarged end portions of said tubular members and welded thereto, the said sleeve and said end portions of the tubular members having walls of sufficient thickness to give them, after the last-named welding operation, a strength at least as great as that of the portions of the hardened tubular members intermediate the said end portions.

HARRY S. GEORGE.